United States Patent
Neff et al.

(10) Patent No.: US 11,194,476 B2
(45) Date of Patent: Dec. 7, 2021

(54) DETERMINING AN OPTIMAL MAINTENANCE TIME FOR A DATA STORAGE SYSTEM UTILIZING HISTORICAL DATA

(71) Applicant: International Business Machines Corporation, Armonk, NY (US)

(72) Inventors: Stefan Neff, Boos (DE); Frank Krick, Ockenheim (DE); Erik Rueger, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 16/559,366

(22) Filed: Sep. 3, 2019

(65) Prior Publication Data

US 2021/0064250 A1 Mar. 4, 2021

(51) Int. Cl.
*G06F 3/06* (2006.01)
*G11B 5/008* (2006.01)
*G06Q 10/06* (2012.01)

(52) U.S. Cl.
CPC .......... *G06F 3/0617* (2013.01); *G06F 3/0634* (2013.01); *G06F 3/0686* (2013.01); *G11B 5/00813* (2013.01); *G06Q 10/06312* (2013.01)

(58) Field of Classification Search
CPC .... G06F 3/0617; G06F 3/0686; G06F 3/0634; G06F 11/3476; G06F 11/3423; G06F 3/067; G06F 3/0653; G11B 5/00813; G11B 27/36; G06Q 10/06312
USPC .......... 369/30.6, 53.1; 711/111, 114, 4, 100, 711/154; 360/69; 702/184
See application file for complete search history.

(56) References Cited

U.S. PATENT DOCUMENTS

| | | | |
|---|---|---|---|
| 7,809,880 B2 | 10/2010 | Forbis, III et al. | |
| 8,406,096 B1* | 3/2013 | Edling | G11B 20/1816 369/34.01 |
| 8,549,185 B2 | 10/2013 | Candelaria et al. | |
| 10,133,490 B2 | 11/2018 | Sinclair et al. | |
| 2005/0052772 A1* | 3/2005 | Barbian | G11B 27/329 360/69 |
| 2005/0071379 A1* | 3/2005 | Kekre | G06F 3/0683 |
| 2010/0030919 A1 | 2/2010 | Flanagan et al. | |

(Continued)

FOREIGN PATENT DOCUMENTS

JP 2018194947 A 12/2018

OTHER PUBLICATIONS

IBM, "FICON Native Implementation and Reference Guide (2nd ed.)," IBM Redbooks, Oct. 2002, pp. 1-263.

(Continued)

*Primary Examiner* — Hong C Kim
(74) *Attorney, Agent, or Firm* — Zilka-Kotab, P.C.

(57) ABSTRACT

A computer-implemented method according to one embodiment includes receiving and storing historical data for historical data jobs performed within a data storage system; determining an optimal maintenance time for the data storage system, utilizing the stored historical data; determining a timing in which storage devices within the data storage system are taken offline, utilizing the optimal maintenance time and the stored historical data; and preparing the data storage system for one or more maintenance operations, utilizing the determined timing.

20 Claims, 7 Drawing Sheets

(56) References Cited

U.S. PATENT DOCUMENTS

| | | | |
|---|---|---|---|
| 2013/0083639 A1* | 4/2013 | Wharton | G11B 27/105 369/53.1 |
| 2016/0148171 A1* | 5/2016 | Phan | G06Q 10/20 702/184 |
| 2018/0107410 A1* | 4/2018 | Gonzalez | G06F 3/067 |
| 2018/0136863 A1 | 5/2018 | Gonzalez et al. | |
| 2019/0258235 A1* | 8/2019 | Xenos | G06N 7/00 |

OTHER PUBLICATIONS

Debeer, B., "ZS02—Just keeping you up-to-date on z/OS!," IBM Redbooks, The Total Solution Event for System z, Mar. 9, 2010, pp. 1-34.

IBM, "Library Data Reports," IBM Knowledge Center, 2 pages, retrieved on Aug. 29, 2019 from https://www.ibm.com/support/knowledgecenter/en/STQRQ9/com.ibm.storage.ts4500.doc/ts4500_data_reporting.html.

IBM, "IBM TS7760," IBM, accessed on Sep. 16, 2019, 4 pages, retrieved from https://www.ibm.com/us-en/marketplace/ts7760.

IBM, "TS7700 product introduction," IBM Knowledge Center, accessed on Sep. 16, 2019, 11 pages, retrieved from https://www.ibm.com/support/knowledgecenter/en/STFS69_3.3.0/ts7740_product_introduction.html.

\* cited by examiner

DETERMINING AN OPTIMAL MAINTENANCE TIME FOR A DATA STORAGE SYSTEM UTILIZING HISTORICAL DATA

BACKGROUND

The present invention relates to data storage and operations, and more specifically, this invention relates to preparing data storage for maintenance operations.

Data storage systems, such as tape storage systems and virtual tape storage systems, are commonly used to provide data storage and retrieval to client applications. These data storage systems often work peer-to-peer, where one data storage system redundantly stores data for another data storage system. In this way, if one data storage system is offline, another peer data storage system may maintain data access to all client applications. However, when maintenance operations are performed on a data storage system, such system is unavailable to redundantly store data for other systems, leaving those other systems vulnerable. It is therefore desirable to minimize a duration of such maintenance operations.

SUMMARY

A computer-implemented method according to one embodiment includes receiving and storing historical data for historical data jobs performed within a data storage system; determining an optimal maintenance time for the data storage system, utilizing the stored historical data; determining a timing in which storage devices within the data storage system are taken offline, utilizing the optimal maintenance time and the stored historical data; and preparing the data storage system for one or more maintenance operations, utilizing the determined timing.

According to another embodiment, a computer program product for preparing a data storage system for maintenance operations includes a computer readable storage medium having program instructions embodied therewith, where the computer readable storage medium is not a transitory signal per se, and where the program instructions are executable by a processor to cause the processor to perform a method including receiving and storing, by the processor, historical data for historical data jobs performed within a data storage system; determining, by the processor, an optimal maintenance time for the data storage system, utilizing the stored historical data; determining, by the processor, a timing in which storage devices within the data storage system are taken offline, utilizing the optimal maintenance time and the stored historical data; and preparing, by the processor, the data storage system for one or more maintenance operations, utilizing the determined timing.

According to another embodiment, a system includes a processor; and logic integrated with the processor, executable by the processor, or integrated with and executable by the processor, where the logic is configured to receive and store historical data for historical data jobs performed within a data storage system; determine an optimal maintenance time for the data storage system, utilizing the stored historical data; determine a timing in which storage devices within the data storage system are taken offline, utilizing the optimal maintenance time and the stored historical data; and prepare the data storage system for one or more maintenance operations, utilizing the determined timing.

Other aspects and embodiments of the present invention will become apparent from the following detailed description, which, when taken in conjunction with the drawings, illustrate by way of example the principles of the invention.

DETAILED DESCRIPTION

Figure 1:
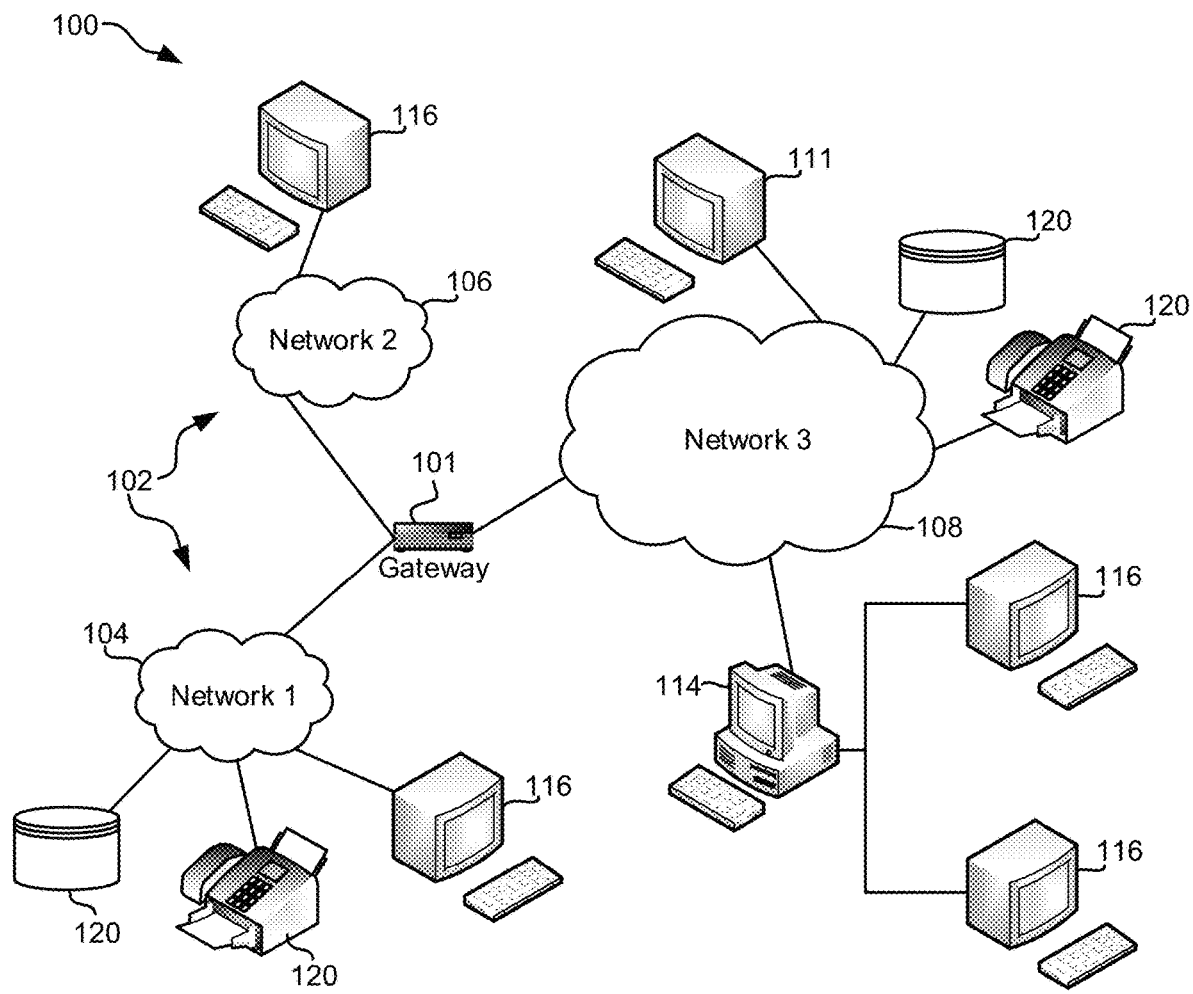
FIG. 1 illustrates a network architecture, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for preparing a data storage system for maintenance operations.

In one general embodiment, a computer-implemented method includes receiving and storing historical data for historical data jobs performed within a data storage system; determining an optimal maintenance time for the data storage system, utilizing the stored historical data; determining a timing in which storage devices within the data storage system are taken offline, utilizing the optimal maintenance time and the stored historical data; and preparing the data storage system for one or more maintenance operations, utilizing the determined timing.

In another general embodiment, a computer program product for preparing a data storage system for maintenance operations includes a computer readable storage medium having program instructions embodied therewith, where the computer readable storage medium is not a transitory signal per se, and where the program instructions are executable by a processor to cause the processor to perform a method including receiving and storing, by the processor, historical data for historical data jobs performed within a data storage system; determining, by the processor, an optimal maintenance time for the data storage system, utilizing the stored historical data; determining, by the processor, a timing in which storage devices within the data storage system are taken offline, utilizing the optimal maintenance time and the stored historical data; and preparing, by the processor, the data storage system for one or more maintenance operations, utilizing the determined timing.

In another general embodiment, a system includes a processor; and logic integrated with the processor, executable by the processor, or integrated with and executable by the processor, where the logic is configured to receive and store historical data for historical data jobs performed within a data storage system; determine an optimal maintenance time for the data storage system, utilizing the stored historical data; determine a timing in which storage devices within the data storage system are taken offline, utilizing the optimal maintenance time and the stored historical data; and prepare the data storage system for one or more maintenance operations, utilizing the determined timing.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
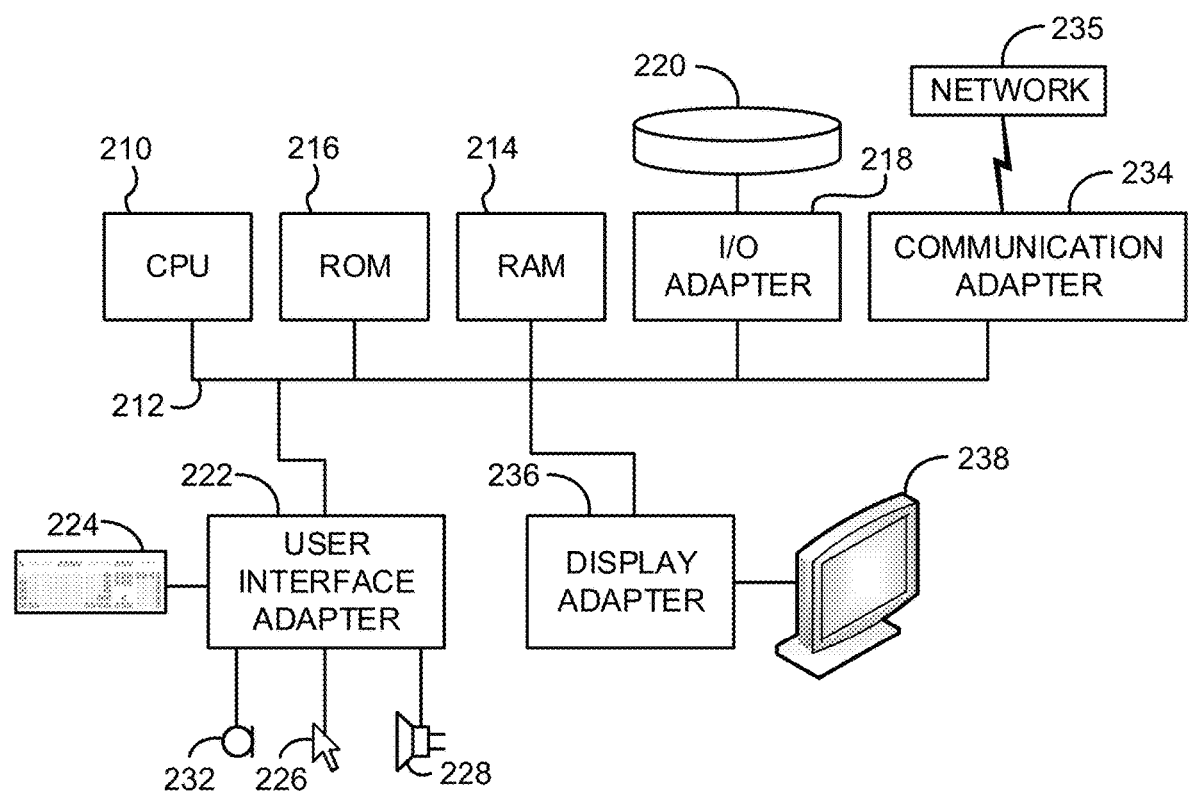
FIG. 2 shows a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
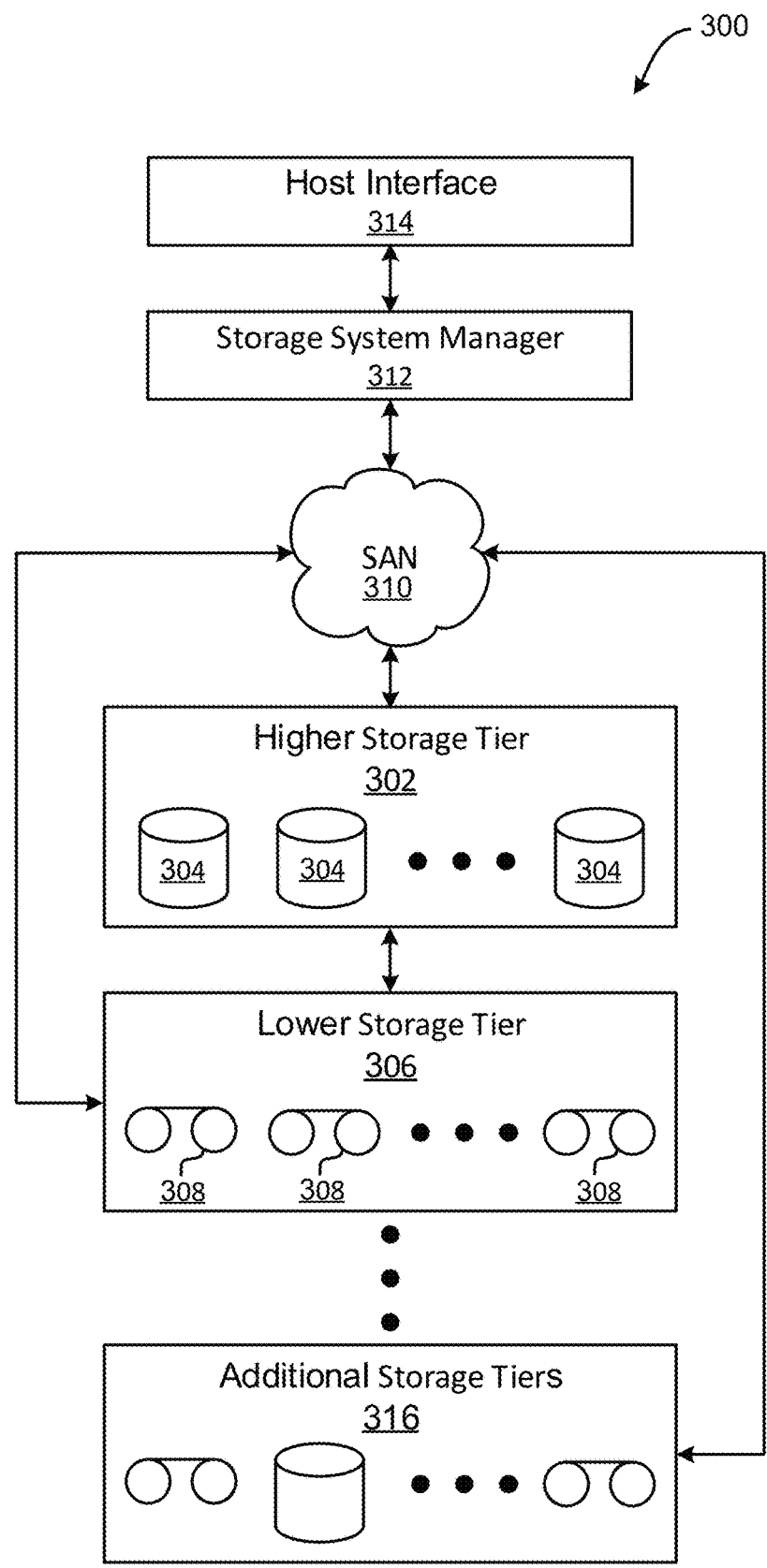
FIG. 3 illustrates a tiered data storage system in accordance with one embodiment of the present invention.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
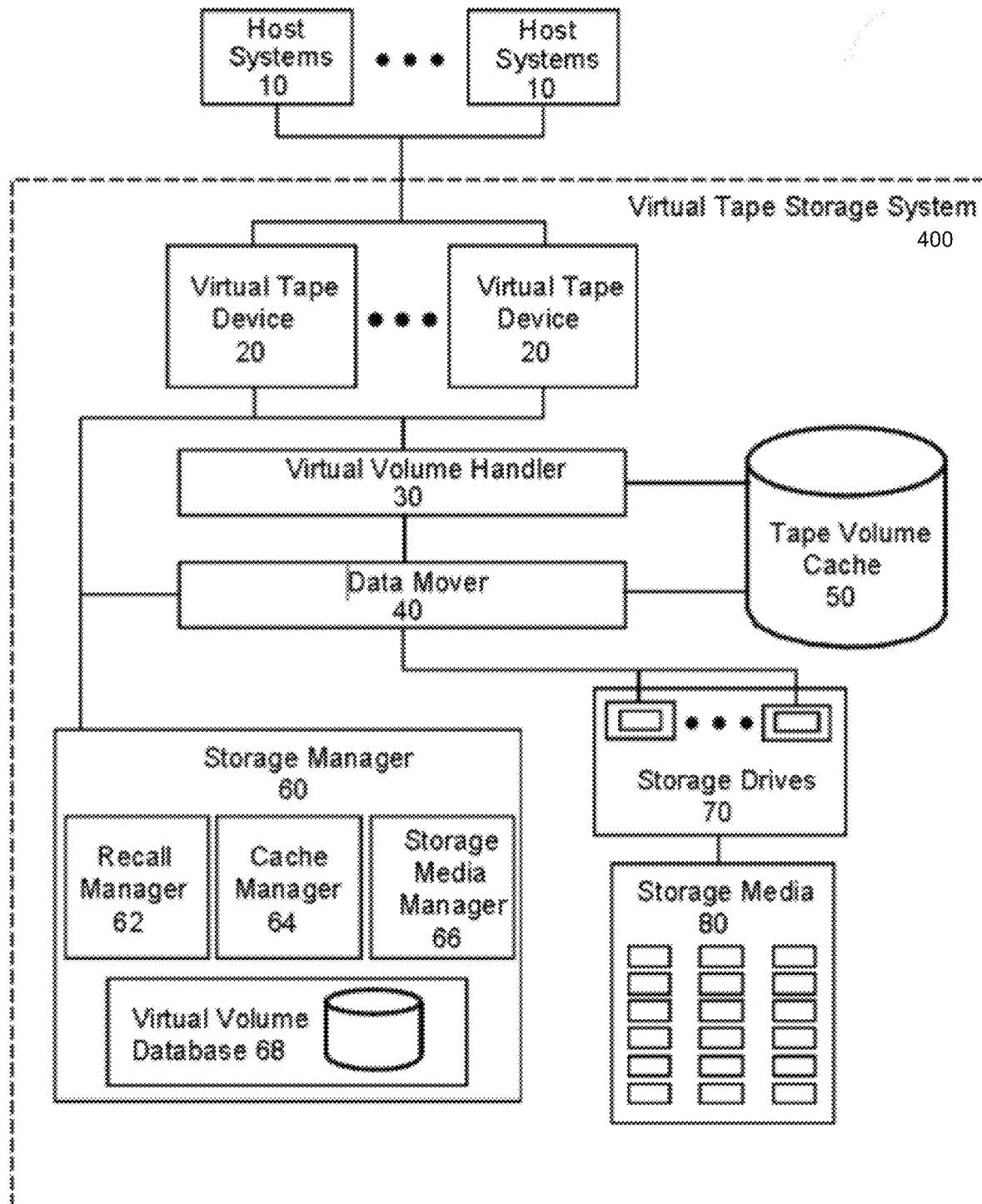
FIG. 4 is a block diagram showing an interconnection of functional components of a virtual tape storage system, in accordance with one embodiment.

Referring now to FIG. 4, a block diagram of a virtual tape storage (VTS) system 400, for example an IBM TS7700 Virtual Tape Storage System, is shown coupled to a plurality of host systems 10. Application programs running within any host system 10 generate data to be stored within the VTS system 400. The host system 10 may be embodied by a variety of types and numbers of processing units, such as a mainframe computer, a personal computer, a server, a workstation, etc. The application programs may be of any number of types, including, but not limited to, hierarchical storage, data backup/recovery, master data file processing, etc.

Applications particularly well suited to utilize some embodiments of the methods and systems described herein are hierarchical storage applications, such as IBM Data Facility Storage Management System (DFSMS) Hierarchical Storage Manager (HSM), IBM Tivoli Storage Manager, etc. How these applications utilize tape storage is known in the art. The VTS system 400 includes a plurality of virtual tape devices 20 interconnected to the host system 10 and a virtual volume handler 30. The virtual volume handler 30 is coupled to the tape volume cache 50. A data mover 40 is also coupled to the tape volume cache 50 and a plurality of storage drives 70. Also, included in the VTS system 400 is a plurality of storage media 80. The storage media 80 may comprise a variety of types of sequential storage media, such as magnetic tape, optical disk, etc. The storage drives 70 may also include magnetic tape drives, optical drives, etc. Storage media 80 is moved to/from storage drives 70 by mechanical means (such as an automated tape system, not shown). The storage manager 60 is also coupled to the host system 10 through the virtual tape devices 20 as well as to all other elements of the VTS system 400. The storage manager 60 is comprised of at least one recall manager 62, at least one cache manager 64, at least one storage media manager 66 and at least one virtual volume database 68. The storage manager 60 may comprise a digital processing apparatus such as a microprocessor, personal computer, a more advanced processing machine, etc. The number of virtual volumes (e.g., volume 200 of FIG. 2) included in a VTS system 400 may number in the hundreds to the tens of thousands to many millions. Information about each of the virtual volumes 200 included in the VTS system 400 is kept in the virtual volume database 68 by the storage manager 60. The storage for the virtual volume database 68 is typically disk, but other non-volatile storage technologies, such as flash, RAM, etc., may be employed.

Figure 5:
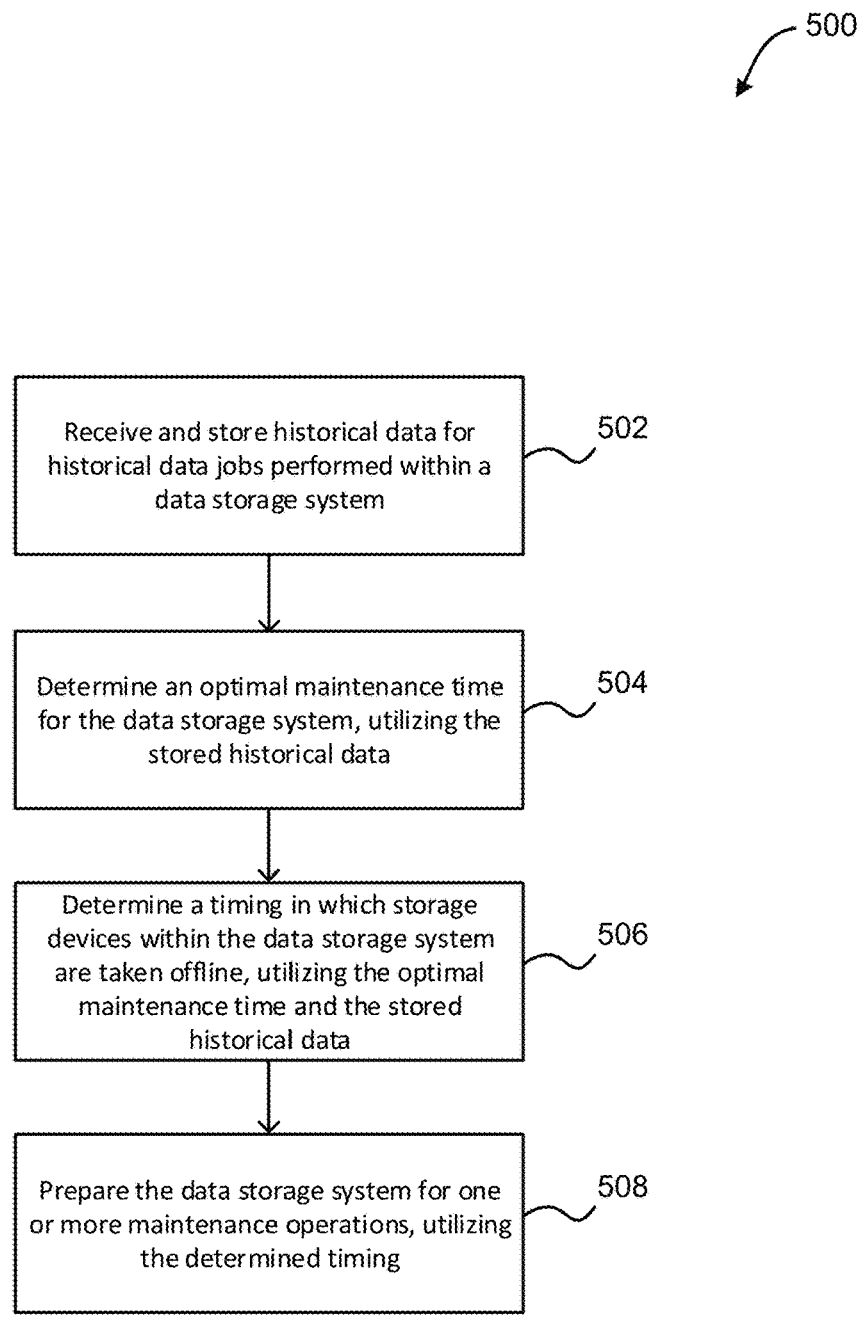
FIG. 5 illustrates a method for preparing a data storage system for maintenance operations, in accordance with one embodiment of the present invention.

Now referring to FIG. 5, a flowchart of a method 500 is shown according to one embodiment. The method 500 may be performed in accordance with the present invention in any of the environments depicted in FIGS. 1-4, among others, in various embodiments. Of course, greater or fewer operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where historical data for historical data jobs performed within a data storage system is received and stored. In one embodiment, the data storage system may include a plurality of storage devices (e.g., a cluster of tape drives, virtualized tape drives, etc.). For example, the historical data may be received and stored for each of the plurality of storage devices.

Additionally, in one embodiment, the data storage system may include a tape storage system (e.g., a storage system that utilizes a plurality of tape drives to provide storage for one or more external client devices, etc.). In another embodiment, the data storage system may include a virtual tape storage system (e.g., a storage system that utilizes a plurality of drives virtualized as tape drives to provide storage for one or more external client devices, etc.).

Further, in one embodiment, historical data jobs may each include a data transfer, including one or more of storage and retrieval of data within the data storage system. For example, the historical data jobs may include historical data writes to one or more drives within the data storage system. In another example, the historical data jobs may include historical data reads from one or more drives within the data storage system. Each of the historical data jobs may have been performed before a current time.

Further still, in one embodiment, the historical data may include a size of the data that was transferred (e.g., written or read) between the data storage system and one or more client devices. For example, the size of the data may be obtained via a fiber connection (FICON) command control layer. In another example, the size of the data may include a length of a job in blocks.

Also, in one embodiment, the historical data may include a source of a request for the data transfer (e.g., an identification of an external client device, etc.). In another embodiment, the historical data may include a time needed to complete the historical data job. For example, the historical data job may include a transfer of data between the data storage system and one or more client devices. In another example, for each historical data job, the historical data may include a time needed for the data storage system to complete the data transfer. In yet another example, the transfer time may be obtained via the fiber connection (FICON) command control layer.

In addition, in one embodiment, the historical data may include runtime environment data. For example, for each historical data transfer, the historical data may include a drive usage during the data transfer, a network bandwidth during the data transfer, CPU usage within the data storage system during the data transfer, etc. In another embodiment, the historical data may be obtained utilizing one or more daemons implemented within the data storage system. In yet another embodiment, the historical data may be stored within a data store (e.g., an historical job database, etc.).

Furthermore, method 500 may proceed with operation 504, where an optimal maintenance time for the data storage system is determined utilizing the stored historical data. In one embodiment, determining the optimal maintenance time may include generating a weighted curve based on the stored historical data. For example, an historical time period may be divided into a plurality of historical time instances (e.g., specific predetermined times within the historical time period, etc.).

Further still, in one example, a total job weight may be determined for each of the plurality of historical time instances. For instance, for each of the plurality of historical time instances, a weight may be determined for all historical data jobs running within the data storage system at that historical time instance. For each historical data job running within a given historical time instance, a weight for the job may be determined by multiplying a total length of the job (e.g., a total number of blocks for the job) by a remaining length of the job (e.g., a total number of blocks remaining to be transferred for the job). The weights for all historical data jobs running within the data storage system at that historical time instance may be summed to determine the total job weight for the historical time instance.

Also, in one embodiment, the total job weights for all of the historical time instances may be plotted, which may result in a weighted curve. In another embodiment, the weighted curve may indicate patterns within the utilization of the data storage system during the historical time period. In yet another embodiment, the weighted curve may be analyzed to determine an historical time instance within the curve that has the lowest total job weight.

Additionally, in one embodiment, the historical time instance with the lowest total job weight may be determined as the optimal maintenance time. In another embodiment, a plurality of historical time instances having total job weights below a predetermined threshold value may be compiled, and one of the compiled historical time instances may be selected as the optimal maintenance time. In yet another embodiment, the weighted curve may be input into a neural network or other artificial intelligence solution along with additional stored historical data to determine one or more optimal maintenance times for the data storage system.

Further, in one embodiment, the optimal maintenance time may include a time at which one or more maintenance operations are to be performed within the data storage system. For example, the optimal maintenance time may include a time at which all storage devices within the data storage system are taken offline in order to perform the one or more maintenance operations. In another example, the optimal maintenance time may include a time at which no data jobs are being performed within the data storage system so that the one or more maintenance operations may be performed.

Further still, method 500 may proceed with operation 506, where a timing in which storage devices within the data storage system are taken offline is determined utilizing the optimal maintenance time and the stored historical data. In one embodiment, a data storage system drain-out process may include the process by which the storage devices within the data storage system are progressively taken offline. In another embodiment, the data storage system drain-out process begins with all storage devices running (e.g., online) within the data storage system, and ends with all storage devices not running (e.g., offline) within the data storage system.

Also, in one embodiment, the timing of the data storage system drain-out process may be determined based on the determined optimal maintenance time. In another embodiment, after the start of the data storage system drain-out process, storage devices may be progressively taken offline as they complete all associated data jobs so that all storage devices are offline at the optimal maintenance time.

In addition, in one embodiment, before the start of the data storage system drain-out process, each storage device is online. For example, each of the online storage devices may have one or more associated data jobs. In another example, one or more of the online storage devices may be currently performing a current data job, and may have one or more queued data jobs assigned to the storage device to complete after the current data job.

Furthermore, in one embodiment, before the start of the data storage system drain-out process, each storage device may be compared to the stored historical data for that storage device to determine a remaining job runtime for the storage device (e.g., an amount of time for the storage device to complete all current and queued data jobs currently assigned to the storage device). For example, for each storage device, historical job runtimes and runtime environment data for that storage device may be compared to currently assigned jobs and runtime environment data for that storage device to determine a remaining job runtime for the storage device. In another example, for each storage device, currently assigned jobs and runtime environment data for that storage device may be input into a neural network trained using historical job runtimes and runtime environment data for that storage device to determine a remaining job runtime for the storage device.

Further still, in one embodiment, the storage device with the largest remaining job runtime may be used to calculate the time at which the data storage system drain-out process begins. For example, the largest remaining job runtime may be subtracted from the optimal maintenance time to determine the time at which the data storage system drain-out process begins.

Also, in one embodiment, during the data storage system drain-out process, one or more incoming data jobs may be received by the data storage system. In another embodiment, each of the incoming data jobs and current runtime environment data may be compared against historical job runtimes and runtime environment data to determine a runtime for the incoming data jobs.

Additionally, in one embodiment, each of the incoming data jobs may be conditionally assigned to a storage device within the data storage system, based on the determined runtime for the incoming data jobs. For example, for each storage device of the storage system, a drain-out time may be determined by determining a difference between a current time and the optimal maintenance time. In another example, if a difference between a remaining job runtime for the storage device and a drain-out time is greater than a determined runtime for an incoming data job, the incoming data job may be assigned to the storage device (e.g., the incoming data job may be added to the associated data jobs for the storage device, etc.). In yet another example, if a difference between a remaining job runtime for the storage device and a drain-out time is less than a determined runtime for an incoming data job, the incoming data job may not be assigned to the storage device. In this way, it may be determined that the incoming data job may completed by the storage device before the optimal maintenance time.

Further, method 500 may proceed with operation 508, where the data storage system is prepared for one or more maintenance operations, utilizing the determined timing. In one embodiment, preparing the data storage system for one or more maintenance operations may include implementing the data storage system drain-out process at the calculated time. In another embodiment, preparing the data storage system for one or more maintenance operations may include monitoring all storage devices within the data storage system as they implement their associated data jobs.

Further still, in one embodiment, preparing the data storage system for one or more maintenance operations may include conditionally assigning one or more incoming data jobs to one or more storage devices during the data storage system drain-out process (e.g., based on the above analysis, etc.). In another embodiment, preparing the data storage system for one or more maintenance operations may include progressively taking all storage devices offline as the storage devices complete their associated data jobs.

Also, in one embodiment, preparing the data storage system for one or more maintenance operations may include suspending an input/output (I/O) schedule for the data storage system at the optimal maintenance time. In another embodiment, preparing the data storage system for one or more maintenance operations may include sending one or more incomplete data jobs to another data storage system at the optimal maintenance time, if the incomplete data jobs are not completed by the optimal maintenance time.

In addition, in one embodiment, preparing the data storage system for one or more maintenance operations may include setting the data storage system into a service preparation mode to prevent new data jobs from being started within the data storage system. In another embodiment, one or more maintenance operations may be performed within the data storage system after the data storage system has been prepared. The one or more maintenance operations may include one or more software updates, one or more hardware updates, a restarting of one or more components of the data storage system, a replacement of one or more components of the data storage system, etc.

In this way, an optimized drain-out process may be implemented within the data storage system in order to prepare the data storage system for one or more maintenance operations. This optimized drain-out process may minimize an amount of time that the data storage system is offline, which may improve a performance of systems utilizing the data storage system. For example, a first data storage system may redundantly store data that is stored within a second data storage system. When maintenance operations need to be performed on the first data storage system, the optimized drain-out process may be implemented within the first data storage system to minimize an amount of time the first data storage system is offline. This minimizes an amount of data within the second data storage system that is not redundantly stored at the first data storage system during the maintenance operations, which may improve a performance of the second data storage system. This may also minimize an amount of bandwidth needed to restore the first data storage system after the maintenance operations, which may improve a performance of one or more computer networks used by the first and second data storage systems.

Figure 6:
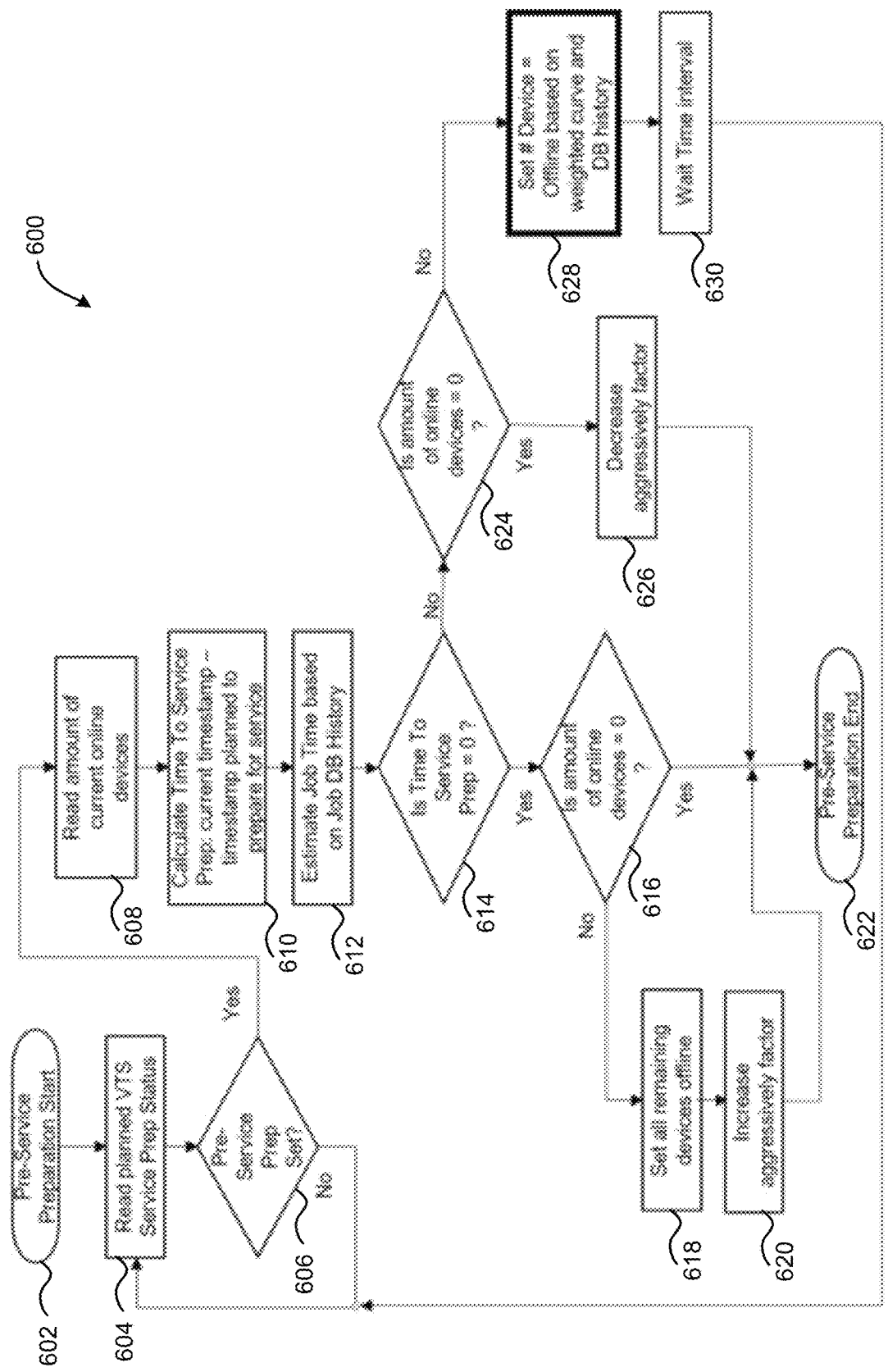
FIG. 6 illustrates a method for performing a pre-service preparation for a data storage system, in accordance with one embodiment of the present invention.

Now referring to FIG. 6, a flowchart of a method 600 for performing a pre-service preparation for a data storage system is shown according to one embodiment. The method 600 may be performed in accordance with the present invention in any of the environments depicted in FIGS. 1-4, among others, in various embodiments. Of course, greater or fewer operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a pre-service preparation process starts. Additionally, method 600 may proceed with operation 604, where a service preparation timestamp is requested by the user. Further, method 600 may proceed with decision 606, where it is determined whether a service preparation time is defined. If it is determined in decision 606 that a service preparation time is not defined, the process loops back, awaiting a user entry to operation 604.

If it is determined in decision 606 that a service preparation time is defined, method 600 may proceed with operation 608, where an amount of devices currently on-line is read from the system. Further, method 600 may proceed with operation 610, where a delta value is calculated from a current time to a time when the system is targeted to be in service mode. Further still, method 600 may proceed with operation 612, where a time the job requires is estimated based on a recorded job DB history.

Also, method 600 may proceed with decision 614, where it is determined whether a service time is reached. If it is determined in decision 614 that a service time is reached, method 600 may proceed with decision 616, where the it is determined whether all drive resources are off-line. If it is determined in decision 616 that all drive resources are not off-line, then method 600 may proceed with operation 618, where the remaining on-line devices are taken off-line. Additionally, method 600 may proceed with operation 620, where an aggressiveness factor is increased in order to take more devices off-line in the next cycle when a next service window is defined in the future. Furthermore, method 600 may proceed with operation 622, where the pre-service preparation process ends.

If it is determined in decision 614 that a service time is not reached, method 600 may proceed with decision 624, where it is determined whether all drive resources are off-line. If it is determined in decision 624 that all drive resources are off-line, then method 600 may proceed with operation 626, where an aggressiveness factor is decreased. This may be performed since there was still time left before the defined service preparation point in time, and additional jobs could have been performed (and the invented process was too aggressive). Also, method 600 may proceed with operation 622, where the pre-service preparation process ends.

If it is determined in decision 624 that all drive resources are not off-line, then method 600 may proceed with operation 628, where resources are taken off-line based on the results of a weight curve stored from a history for each operation job projected to the current point in time. Additionally, method 600 may proceed with operation 630, where waiting is performed for a predetermined time interval. Further, method 600 may proceed with operation 604, where a service preparation timestamp is again requested by the user, and the process continues with the next loop and a closer time until the service preparation should happen.

Self-Learning Service Preparation in a Mainframe Virtual Tape Environment

Mainframe virtual tape subsystems may be based on a high-availability architecture that includes at least two systems (clusters) working peer-to-peer. This ensures that in case of a failure or a planned service outage of one cluster, the other remaining system will maintain data access and system availability to the attached host(s).

However, during a failure or service scenario where one system is temporarily unavailable, the new processed data cannot be stored redundantly. This leads to a single point of failure for data loss and operations. Therefore, it is desirable to minimize an overall outage time frame as much as possible.

The total duration of an outage for a planned service task can be divided into three timeframes of a Subsystem Service Window (e.g. for a planned uCode Update or other service task):

1. Preparation time
2. The actual service/maintenance task
3. Post maintenance time There is a significant risk potential in the first stage (preparation time). During this time, the client is responsible to stop processing new host jobs at the system a certain amount of time before the maintenance window. Currently running jobs (driven by various applications) also need to finish (otherwise they continue to occupy the devices of the cluster to be serviced). Historically, a user (e.g., system administrator) may set all devices offline at the beginning of the service preparation task and may wait until all currently running jobs are finished.

This time is unpredictable and may delay the planned maintenance task and extend the duration of the service outage. Also, these running jobs cannot be canceled easily, as they would fail the jobs and may lead to data corruption.

In one embodiment, ongoing host backup activities and jobs from the various applications and logical partitions may be verified and monitored by a task. This task will learn details of various backup streams over time (e.g., how long the various backup streams will occupy the various devices, paths of the attached virtual tape subsystem, etc.). Utilizing this knowledge and cognitive methods, a future planned service window may be received, and the system will calculate and start at an optimal timing to steer jobs to the other remaining subsystem, to prevent occupation of the system devices planned to be serviced. In parallel, such a system will set the virtual devices consecutively offline one by one within the subsystem to be serviced. In this way, at the specified service time no job may occupy and block the planned service task on the selected tape subsystem/cluster, and all devices may be offline.

Virtual Tape Subsystem

A virtual tape subsystem (VTS) consists of a server providing virtual software emulated tape resources to its attached hosts for backup/restoring of data in a sequential format. The VTS (Virtual Tape server) includes a server computer operating the VTS software components, a tape library controller, internal disk cache, and an optional attached physical tape library.

An attached host implements data I/O via a FICON channel to the VTS. The VTS server stores the data to its attached disk cache for fast data I/O to host. The VTS server manages its disk cache capacity based on hot/cold data mapping, such that data which was not accessed for a period of time that exceeds a threshold will be migrated out to physical tape. If cold data is requested from the host, the VTS server restores the requested data from the corresponding physical magnetic tape cartridge into the VTS disk cache for the host to access it.

The VTS can operate with multiple VTS systems in a network for high availability in a clustered redundant environment called a grid. Additionally, the VTS utilizes FICON, such that each command received has an amount of data to be transferred and a counter to control a size of the data-blocks.

Backup Schedule

In enterprise operations, data backups are required in a continuous manner in order to reduce a risk of data loss.

The more parallel resources (e.g., drives) that are active, the more difficult it is to manage these resources to be set offline at a dedicated point in time.

Service Steps

Table 1 illustrates exemplary steps that need to be performed in order to implement a maintenance operation within a VTS.

TABLE 1

| Pre-Service Preparation Tasks | Maintenance Window | Post-Service Preparation Tasks |
|---|---|---|
| Suspend tape system I/O schedule | Set VTS into service mode | Remove VTS from Service Mode |
| If possible, move I/O to another VTS | Upgrade VTS Software | Restart suspended tape system I/O schedule to continue operation |
| Set VTS into Service Prep to avoid new tasks to be started | Repair disk cache and virtual cartridges | If needed fail back I/O from another VTS |

In one embodiment, a job history database may be continuously generated and maintained based on job initiation data from a host and job runtime data from a VTS. A new process is added into the VTS control unit FC driver, extracting information from the command layer regarding the amount of data to be transferred (e.g., the payload) from hosts to VTS devices and implementing an I/O-Block counter indicating how many data blocks have been already processed.

A weighted curve is generated based on the job-history database to estimate an optimal point in time for a maintenance window. Drain-out-timing of devices is then determined for the defined maintenance window. The draining process is then optimized to utilize devices to complete jobs that fit into a remaining time until a start of a maintenance window, using the job history database of known jobs. Pre-Service Preparation actions are then managed (e.g., by setting host devices offline, etc.).

Job History Database

Table 2 illustrates the three types of historical data that are compiled within a job history database.

Drain-Out Timing Calculation

Based on the given maintenance window, estimated by the weighting curve calculation, the drain out timing may be calculated for the system in order to guarantee the service. Each drive may be set offline based on the calculation in order to disallow further jobs on the drive.

The given maintenance window is matched to the job history database to estimate, for each drive, the remaining job runtime data. The job with the highest remaining runtime may define the starting point for the drain out process. Jobs with a remaining runtime lower than the maintenance schedule may run before the drive will be set offline.

Optimizing the Drain-Out Process

To optimize the system utilization during drain-out of the system, additional jobs may be allowed to run on individual drives. Additional jobs may be assigned to each drive upon determining that they will end by the scheduled maintenance window.

Each incoming job request contains the job core data but not the job runtime data. Each incoming job may be matched to one of the job history database jobs to determine a runtime estimation for the incoming job. A single match may give an

TABLE 2

| Job Core Data | Job Runtime Data | Runtime Environment Data |
|---|---|---|
| Job data are provided at the time when a job arrives as a request from the host system. It contains metadata like the source of the job and the size of the data to be transferred on the FICON/FC command control layer. | Runtime data are captured and calculated while a job is running on the system. It contains data like a specific drive, the throughput, the start and end times, and other job-related runtime information (e.g. the actual counter of transferred blocks, blocks in transfer, and blocks outstanding to be transferred). This information is extracted from the FICON/ FC command control layer. | Environment data are captured when the system is running and performing multiple jobs in parallel. For each running job environment data are linked to each job within the history DB. It contains the current drive usage, network bandwith, CPU usage, etc. |

Weighted Curve Generation

For each time within the job history database, the weight for each job at each time may be calculated for each drive as follows: (weight)=(total length of the job)×(remaining length of the job).

The calculation of weight for each time within the job history database will result in a weighting curve. Within this curve low as well as high values for the usage of the drives may be seen. The estimation for an eligible maintenance window may match with one of the lowest values within the weighting curve to optimize the drain out process for a scheduled maintenance window.

estimation, but multiple matches may be averaged to provide an improved estimation. An aggressiveness factor will be added to the calculation to minimize a risk of overrunning the estimated maintenance schedule window. Also, environmental data stored within the job history database may be compared to current environmental information in order to increase an accuracy of the time estimation.

If a new job does not match to one or more stored jobs in the job history database, it may not be assigned to a storage device.

Figure 7:
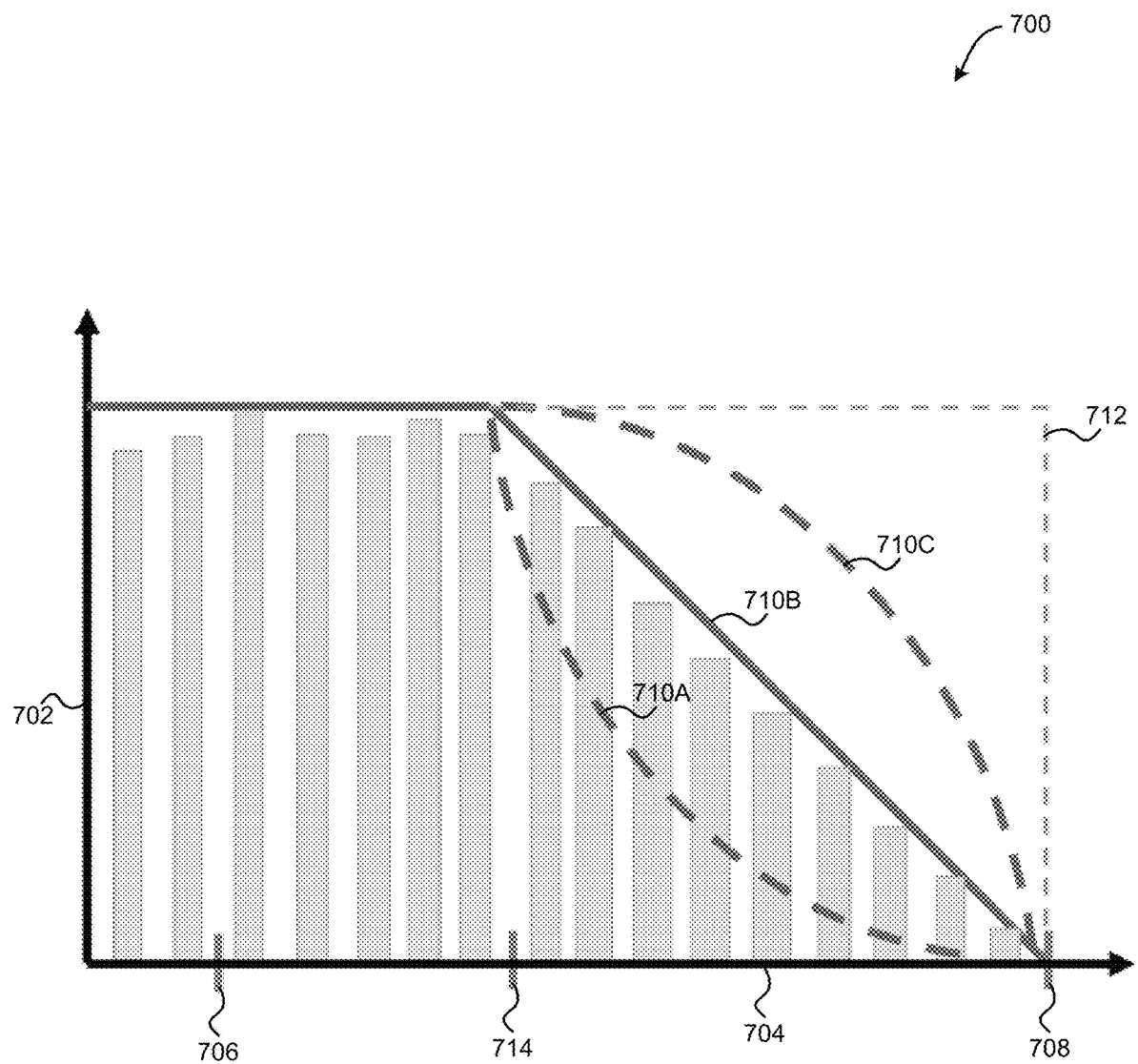
FIG. 7 illustrates an exemplary data storage system drain-out process, in accordance with one embodiment of the present invention.

FIG. 7 illustrates an exemplary data storage system drain-out process 700, according to one exemplary embodiment. The drain-out process 700 shows the number of online storage devices 702 for a system over time 704. At a first time 706, a user specifies a desired maintenance time 708. Based on the desired maintenance time 708 and the stored historical data, a start time 714 is determined for the drain-out-process. At the start time 714, the number of online storage devices 702 is gradually decreased over time 704 according to one of the weighted curves 710A-C until all online storage devices are offline at the desired maintenance time 708. The weighted curves 710A-C differ from the projected online system curve 712, and one of the weighted curves 710A-C may be implemented during the drain-out based on an evaluation of stored historical data and incoming data jobs.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving and storing historical data for historical data jobs performed within a data storage system;
   determining an optimal maintenance time for the data storage system, utilizing the stored historical data;
   determining a timing in which storage devices within the data storage system are taken offline, utilizing the optimal maintenance time and the stored historical data; and
   preparing the data storage system for one or more maintenance operations, utilizing the determined timing.

2. The computer-implemented method of claim 1, wherein the data storage system includes a cluster of tape drives.

3. The computer-implemented method of claim 1, wherein the data storage system includes a cluster of virtualized tape drives.

4. The computer-implemented method of claim 1, wherein the historical data includes:
   a size of data that was transferred between the data storage system and one or more client devices,
   a source of a request for the data transfer,
   a time needed to complete an historical data job, and
   runtime environment data.

5. The computer-implemented method of claim 1, wherein determining the optimal maintenance time includes generating a weighted curve based on the stored historical data.

6. The computer-implemented method of claim 1, wherein the optimal maintenance time includes a time at which one or more maintenance operations are to be performed within the data storage system.

7. The computer-implemented method of claim 1, wherein a data storage system drain-out process includes a process by which the storage devices within the data storage system are progressively taken offline.

8. The computer-implemented method of claim 1, wherein a timing of a data storage system drain-out process is determined based on the optimal maintenance time.

9. The computer-implemented method of claim 1, wherein before a start of a data storage system drain-out process, each storage device is compared to stored historical data for that storage device to determine a remaining job runtime for the storage device, and a storage device with a largest remaining job runtime is used to calculate a time at which the data storage system drain-out process begins.

10. The computer-implemented method of claim 1, wherein during a data storage system drain-out process:
    one or more incoming data jobs are received by the data storage system,
    each of the incoming data jobs and current runtime environment data is compared against historical job runtimes and runtime environment data to determine a runtime for the incoming data jobs, and
    each of the incoming data jobs is conditionally assigned to a storage device within the data storage system, based on the runtime for the incoming data jobs.

11. The computer-implemented method of claim 1, wherein preparing the data storage system for one or more maintenance operations includes implementing a data storage system drain-out process at a calculated time.

12. The computer-implemented method of claim 1, wherein preparing the data storage system for one or more maintenance operations includes conditionally assigning one or more incoming data jobs to one or more storage devices during a data storage system drain-out process.

13. The computer-implemented method of claim 1, wherein one or more maintenance operations are performed within the data storage system after the data storage system has been prepared.

14. A computer program product comprising one or more non-transitory computer readable storage media, and program instructions collectively stored on the one or more non-transitory computer readable storage media, the program instructions comprising instructions configured to cause one or more processors to perform a method comprising:
    receiving and storing, by the one or more processors, historical data for historical data jobs performed within a data storage system;
    determining, by the one or more processors, an optimal maintenance time for the data storage system, utilizing the stored historical data;
    determining, by the one or more processors, a timing in which storage devices within the data storage system are taken offline, utilizing the optimal maintenance time and the stored historical data; and
    preparing, by the one or more processors, the data storage system for one or more maintenance operations, utilizing the determined timing.

15. The computer program product of claim 14, wherein the data storage system includes a cluster of tape drives.

16. The computer program product of claim 14, wherein the data storage system includes a cluster of virtualized tape drives.

17. The computer program product of claim 14, wherein the historical data includes:
    a size of data that was transferred between the data storage system and one or more client devices,
    a source of a request for the data transfer,
    a time needed to complete an historical data job, and
    runtime environment data.

18. The computer program product of claim 14, wherein determining the optimal maintenance time includes generating a weighted curve based on the stored historical data.

19. The computer program product of claim 14, wherein the optimal maintenance time includes a time at which one or more maintenance operations are to be performed within the data storage system.

20. A system, comprising:
    a processor; and
    logic integrated with the processor, executable by the processor, or integrated with and executable by the processor, the logic being configured to:
    receive and store historical data for historical data jobs performed within a data storage system;
    determine an optimal maintenance time for the data storage system, utilizing the stored historical data;
    determine a timing in which storage devices within the data storage system are taken offline, utilizing the optimal maintenance time and the stored historical data; and
    prepare the data storage system for one or more maintenance operations, utilizing the determined timing.

* * * * *